UNITED STATES PATENT OFFICE.

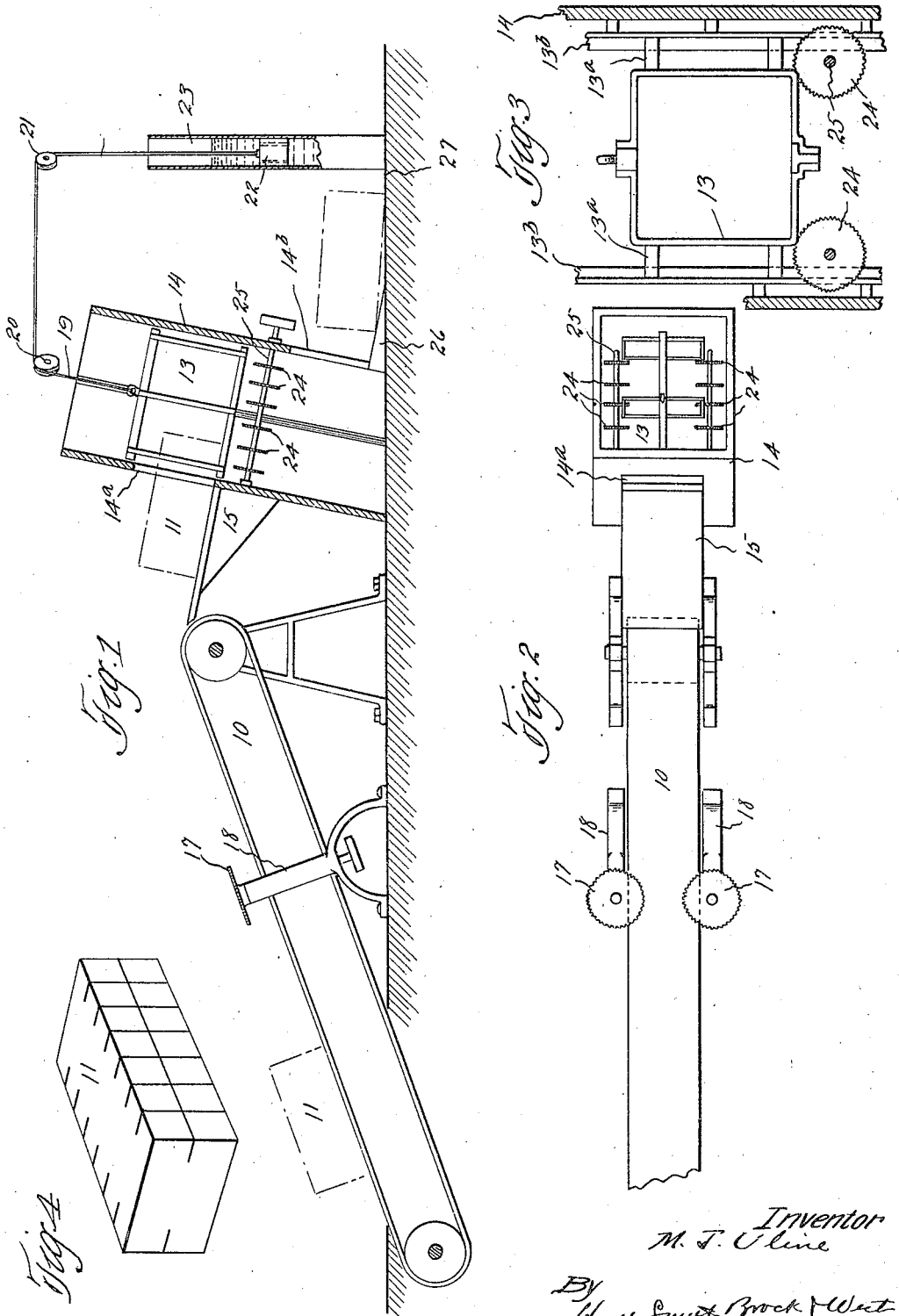

MICHIEL J. ULINE, OF CLEVELAND, OHIO, ASSIGNOR TO THE M. J. ULINE COMPANY, OF TOLEDO, OHIO, A CORPORATION OF OHIO.

METHOD AND APPARATUS FOR SCORING ICE.

1,420,788. Specification of Letters Patent. Patented June 27, 1922.

Application filed January 6, 1921. Serial No. 435,299.

*To all whom it may concern:*

Be it known that I, MICHIEL J. ULINE, a citizen of the United States, residing at Cleveland, in the county of Cuyahoga and State of Ohio, have invented a certain new and useful Improvement in Methods and Apparatus for Scoring Ice, of which the following is a full, clear, and exact description, reference being had to the accompanying drawings.

This invention is an improved method of and means for scoring a block or cake of ice so that it can be quickly, easily and accurately divided into a number of smaller blocks or pieces by the aid of an ordinary ice pick or other suitable tool.

The object of the invention is to provide a simple and efficient method and means which can be applied to an ordinary ice house platform and which will act upon the ice while the block or cake is in motion; and with these objects in view the invention consists in providing a movable carrier for elevating a block or cake of ice, arranging horizontal saws upon opposite sides of said elevator, so that the cake is scored horizontally on opposite sides as it moves along, arranging a cage in a chute at the end of said elevator which cage is caused to descend by the weight of the block or cake held therein and bring said block or cake into contact with a series of vertical saws by means of which the block or cake is scored vertically at definite points as the cage descends to the bottom of the chute, where the block or cake is automatically discharged upon the platform, ready for delivery to a sales wagon.

The invention consists also in certain details hereinafter fully described and pointed out in the appended claims.

In the drawings forming a part of this specification Fig. 1 is a side elevation partly in section of one form of the apparatus designed for carrying my invention into effect. Fig. 2 is a plan view of the same (with the dash pot or control being omitted), Fig. 3 is a detail view of the cage and saws arranged in the chute, and Fig. 4 is a perspective view of a block of ice after scoring.

Various forms of devices may be employed for carrying my invention into effect and in the drawings I have shown one form in which 10 indicates an endless conveyor or elevator of any suitable type and by means of which a block or cake of ice 11 can be elevated from the platform 12 and delivered to a cage 13 which works up and down in a chute 14; there being a suitable guide or shelf 15 interposed between the end of the elevator and the chute to direct the block or cake of ice to the cage, there being an opening 16 in the side of the chute large enough to receive the cake of ice.

Suitable carrying saws or disks 17 are arranged parallel with the elevator, above the same and on opposite sides thereof said saws overhanging the elevator so that as the cake of ice is carried along by said elevator the sides of said cake are scored horizontally as the cake passes between the saws. The saws are mounted upon the upper ends of shafts journaled in suitable frames 18 rotated from any suitable source. When the cake of ice reaches the top of the elevator it is delivered to the inclined guide or shelf 15 and slides through the opening 14ª of the chute 14 and is scored in the cage 13 which is held suspended in the chute by means of a cable 19 passing around the sheaves 20 and 21 to a weight 22 which works in the cylinder 23 filled with oil or water, the weight having suitable passageways through which the oil or water can pass as the weight is raised or lowered. The weight is sufficient to hold the cage in its raised position but when the cake of ice is placed in said cage the weight of the cake is sufficient to raise the weight 22 and cause the cage to descend. The cage is made of channel or angle iron and is so constructed that the sides of the cakes of ice will be exposed to the vertical saws 24 mounted upon the shafts 25 journaled in the chute, said shafts being inclined so that as the cage travels down the chute which is preferably inclined, the sides of the cake will be scored vertically, the shafts upon which the saws are mounted being driven from any suitable source. When the cage reaches the bottom of the chute the cake of ice is discharged through the door 14ᵇ onto the skid 26 down which it slides to the platform 27. By inclining the elevator 10 and imparting tilt or inclination to the chute 14 I am able to perform the scoring operations by means of an apparatus of minimum dimensions. It will be understood, however, that the chute 14 can, if desired, be built vertical and in this event the shaft 25 would be horizontal instead of slightly inclined as shown. The cage 13 is provided with suitable guides 13ᵃ which engage the rails 13ᵈ arranged upon the interior of the chute. By scoring a cake of ice horizontally and vertically upon opposite sides the limits or boundaries of the smaller cakes or blocks are clearly defined and by the use of an ordinary ice pick or other similar tool, the large cake or block can be quickly and easily divided into a number of smaller blocks or cakes. This insures accuracy of measurement in the sale of ice and in case the purchaser should purchase any amount in excess of the smallest sized block, the intermediate mark would serve as an indicating notice of the accuracy of the weight. Other advantages of the method and apparatus would be apparent to everyone skilled in the art to which this invention relates.

Having thus described my invention what I claim is:

1. The herein described method which consists in elevating a block of ice and simultaneously scoring the sides thereof and then lowering said block of ice and simultaneously scoring the sides thereof in a direction transverse to the first score.

2. In a device of the kind described the combination with an elevator, of a scoring device arranged in connection with said elevator, a cage arranged to receive a block of ice from said elevator, and scoring means arranged adjacent said cage and adapted to score a block of ice held therein while said cage is descending.

3. In a device of the kind described, the combination with an elevator, of a scoring device arranged in connection therewith, a vertical movable cage, scoring devices arranged adjacent said cage, means for directing a block of ice to and from the cage and means for returning said cage to its raised position.

4. In a device of the kind described, the combination with an elevator, of scorers arranged upon opposite sides thereof for horizontally scoring a block of ice carried upon said elevator, a chute having upper and lower openings, a vertically movable cage arranged in said chute and adapted to receive a block of ice through the upper opening, scoring devices arranged upon opposite sides of said cage and adapted to score the opposite sides of a block of ice held in said cage as said cage descends, means for regulating the descent of said cage and means for directing the discharge of the block of ice from the cage through the lower opening of the chute.

5. In a device of the kind described, the combination with an elevator, of scoring devices upon opposite sides thereof and adapted to horizontally score a block of ice carried by said elevator, a chute having upper and lower openings, a shelf arranged adjacent the upper opening and a skid arranged adjacent the lower opening, a vertically movable cage adapted to receive a block of ice, scoring devices adapted to vertically score the opposite sides of said block of ice during the descent of the cage, and means for returning the same to its elevated position.

6. In a device of the kind described, the combination with means for elevating a cake of ice, of means for scoring said cake during its elevation, means for receiving said cake so scored, said cake receiving means being movable in a direction transverse to the said score, and scoring means adjacent said cake receiving means and adapted to score a cake of ice held therein during the movement of said means.

7. The herein described method which consists in moving a block of ice in the direction of its length and simultaneously scoring the sides thereof, and then moving said block of ice and simultaneously scoring the sides thereof in a direction transverse to the first score.

8. In a device of the kind described, the combination with means for moving a cake of ice in one direction, of means for scoring said cake during such movement, means for receiving said cake so scored, said cake receiving means being movable in a direction transverse to the said score, and scoring means adjacent said cake receiving means and adapted to score a cake of ice held therein during the movement of said means.

In testimony whereof, I hereunto affix my signature.

MICHIEL J. ULINE.